(12) United States Patent
Kindo et al.

(10) Patent No.: US 7,113,742 B2
(45) Date of Patent: Sep. 26, 2006

(54) COMMUNICATION SYSTEM AND COMMUNICATION DEVICE

(75) Inventors: Tsuyoshi Kindo, Sennan-gun (JP); Takeshi Hatakeyama, Neyagawa (JP); Ken-ichi Moriguchi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 519 days.

(21) Appl. No.: 10/405,694

(22) Filed: Apr. 3, 2003

(65) Prior Publication Data
US 2004/0063471 A1 Apr. 1, 2004

(30) Foreign Application Priority Data
Sep. 30, 2002 (JP) ............... 2002-287934

(51) Int. Cl.
*H04B 7/15* (2006.01)
(52) U.S. Cl. ............ 455/11.1; 455/567; 455/569.1; 455/550.1; 455/566; 455/13.1
(58) Field of Classification Search ............ 455/3.05, 455/419, 420, 426.1, 428, 460, 463, 41.2, 455/74.1, 75, 79, 83, 563, 569.1, 569.2, 95, 455/96, 125, 556.1, 557, 550.1, 525, 414.1, 455/517, 11.1, 13.1, 466, 567; 370/338
See application file for complete search history.

(56) References Cited

U.S. PATENT DOCUMENTS

| | | | |
|---|---|---|---|
| 6,397,086 B1 * | 5/2002 | Chen | 455/569.2 |
| 6,584,320 B1 * | 6/2003 | Kawamoto | 455/457 |
| 2003/0003955 A1 * | 1/2003 | Asai et al. | 455/556 |
| 2003/0218996 A1 * | 11/2003 | Sumino et al. | 370/328 |

FOREIGN PATENT DOCUMENTS

| | | |
|---|---|---|
| EP | 1 052 834 | 11/2000 |
| JP | 61-021666 | 1/1986 |
| JP | 01-264321 | 10/1989 |
| JP | 06-260990 | 9/1994 |
| JP | 07-273762 | 10/1995 |
| JP | 10-229402 | 8/1998 |
| JP | 2000-036818 | 2/2000 |
| WO | 99 30422 | 6/1999 |
| WO | 01 37262 | 5/2001 |
| WO | 01 65867 | 9/2001 |
| WO | WO 01/65867 * | 9/2001 |
| WO | WO 01/65867 A2 * | 9/2001 |

* cited by examiner

*Primary Examiner*—Edan Orgad
*Assistant Examiner*—Dominic E. Rego
(74) *Attorney, Agent, or Firm*—Wenderoth, Lind & Ponack, L.L.P.

(57) ABSTRACT

A communication system 10 is comprised of a communication device 11 and a relay device 12 that is connected to the communication device 11 by radio at close range and an other communication device 15 via a network and that relays a communication between the first device 11 and the other communication device 15. Such communication system 10 comprises local communicating units 112 and 121 and a network communicating unit 123 that detect a disconnection of a radio channel between the communication device 11 and the relay device 12 and a disconnection of a radio channel between the relay device 12 and the other communication device 15. The communication device 11 includes a notifying unit 113 that notifies a user of that a disconnection of which radio channel of a plurality of the radio channels is detected.

31 Claims, 10 Drawing Sheets

COMMUNICATION SYSTEM AND COMMUNICATION DEVICE

BACKGROUND OF THE INVENTION (1) Field of the Invention

The present invention relates to a communication system enabling a communication device on one end and a communication device on the other end to communicate with each other via a relay device, and particularly to a communication system capable of notifying a communication device user of the fact that one of two or more radio channels is disconnected and restoring such disconnected radio channel in an optimal manner.

(2) Description of the Related Art

There is a conventional technology to automatically restore a communication line at the time of an abrupt disconnection of such communication line in a communication system in which communication devices connected via radio communicate with each other (See the Japanese Laid-Open Patent Application No. S61-21666).

The following explains such prior art with reference figures.

FIG. 1 is a block diagram showing a configuration of a conventional communication system. In FIG. 1, a communication system 90 is comprised of a communication device 91, a radio base station 14, a cellular network 13, an other communication device 15 and others.

The communication device 91 includes a displaying unit 191, an input unit 192, a central controlling unit 193, a network communicating unit 194, a number memory unit 195 and others, and a voice signal is inputted/outputted through a microphone 196 and a speaker 197. Furthermore, the communication device 91 is connected to the other communication device 15 via the radio base station 14 and the cellular network 13. Note that the internal configuration of the other communication device 15 is analogous to that of the communication device 91, and a voice signal is inputted/outputted through a microphone 151 and a speaker 152.

Next, an explanation is given for operations in the communication system 90 which is a conventional communication system with the above configuration.

FIG. 2 is a communication sequence diagram illustrating sequences in the communication system 90 shown in FIG. 1 from when a call starts to when a communication line is disconnected and restored.

First, an explanation is provided for an operation performed before a call starts between the communication device 91 and the other communication device 15. As shown in FIG. 2 a usual communication sequence before a call starts is that after a subscriber's number of the other communication device 15 is dialed by a user of the communication device 91 via the input unit 192 (See FIG. 1), an outgoing call request is transmitted to the radio base station 14, which is delivered to the other communication device 15 over the cellular network 13. When detecting a call from the communication device 91, the other communication device 15 outputs a call-accepted signal which is transmitted to the radio base station 14 over the cellular network 13, and the communication device 91 is notified of the completion of the connection. A call starts after the above-described sequence.

When there occurs a line failure in the middle of the call due to, for example, the communication device 91 moving out of the radio area covered by the radio base station 14, and it is detected that the line between the communication device 91 and the other communication device 15 is disconnected, the communication device 91 handles such disconnection by automatically re-calling the subscriber's number of other communication device 15 stored in the number memory unit 195. While the communication line is being restored, the displaying unit 191 of the communication device 91 shows the user that the line failure is being restored.

The communication system 90 explained hereinbefore is a conventional communication system intended only for a single radio channel. If such communication system is multi-connected via a relay device, that is to say, if a communication device on one end and a communication device on the other end are connected to each other via a plurality of radio channels, a line disconnection causes a problem described below.

Upon detection of the line disconnection, the user tries to perform an operation to restore a disconnected channel. However, since there exist two or more radio networks used for the communication, the user has trouble identifying which channel is disconnected and performs a wrong operation, trying to restore the channel as quickly as possible. In other words, such user, who hastily tires to perform a plurality of restoration operations which differ according to the type of a channel, conducts a wrong operation. This makes a problem especially in the case where a communication device used in such a situation is a hands-free device equipped in a car. In a radio hands-free system in which a communication device is a hands-free device and a relay device is a mobile phone, a call between such devices is conducted with the hands-free device and the mobile phone being connected to each other via such a local channel as Bluetooth, and with the mobile phone being connected to a radio base station via a cellular network. If there occurs an abrupt disconnection of one of the two channels, the user who is driving starts an operation to restore such disconnected channel. However, since it is difficult to identify which channel is disconnected, such user hastily tries to perform a plurality of restoration operations which differ depending on the type of a channel. As a result, the user's attention in driving is scattered, which affects his/her ability to drive safely.

In addition to the above, there is another technology which is as follows: in a communication system in which a plurality of subscribers' terminals are connected to a switchboard via an access device, if a breakdown occurs to the access device and such access device is initialized, causing all communication paths to be disconnected, the disconnected communication paths between the plurality of subscribers' terminals and the switchboard are restored to the state before the breakdown, on the basis of data stored in such switchboard (See the Japanese Laid-Open Patent Application No. H10-229420). This technology, however, is not intended for a disconnection of each channel in a plurality of multi-connected radio channels. Therefore, when one of such plurality of the channels is disconnected, it is difficult to identify the disconnected channel, which consequently results in an operating error of the user who is in haste to restore the channel as soon as possible, just like the above-mentioned case.

SUMMARY OF THE INVENTION

In view of the above problem, the present invention aims at providing a communication system, a communication device and the like utilizing radio which are capable of handling a sudden disconnection of one of two or more radio channels.

In order to achieve the above object, the present invention is a communication system comprising: a first communication device; a relay device that is connected to the first communication device by radio at close range and a second communication device via a network and that relays a communication between the first communication device and the second communication device; and a disconnection detecting unit operable to detect a disconnection of a radio channel between the first communication device and the relay device and a disconnection of a radio channel between the relay device and the second communication device, wherein the first communication device includes a notifying unit operable to notify a user which disconnection of a plurality of the radio channels is detected by the disconnection detecting unit.

Accordingly, when a communication between the first communication device and the second communication device is disconnected, since the user is notified of which communication channel is disconnected of a plurality of the communication channels which exist between the first communication device and the second communication device, it is possible for such user to perform a restoration operation suitable for the disconnected channel without confusion, when wishing to restore such disconnected channel.

Especially in the case where the first communication device is a hands-free device and the relay device is a mobile phone in a radio hands-free system, the present invention allows the user to concentrate on driving since such user does not have to perform an operation hastily for restoring the disconnected radio channel.

Furthermore, it is also possible that the first communication device includes a memory unit operable to memorize at least one of restoration information required to restore the radio channel between the first communication device and the relay device when disconnected and restoration information required to restore the radio channel between the relay device and the second communication device when disconnected, and that the communication system comprises a restoring unit operable to reconnect a disconnected radio channel, when one of the radio channel between the first communication device and the relay device and the radio channel between the relay device and the second communication device is disconnected, on the basis of one of the two pieces of restoration information memorized by the memory unit that corresponds to the disconnected radio channel.

Accordingly, since the disconnected radio channel is restored automatically, there is no need for the user to perform a restoration operation in haste.

Moreover, it is possible that the first communication device further includes: an input unit operable to accept an input from the user; and a memory unit operable to memorize at least one of restoration information required to restore the radio channel between the first communication device and the relay device when disconnected and restoration information required to restore the radio channel between the relay device and the second communication device when disconnected, and that the communication system further comprises: a restoration method notifying unit operable to notify the user of a restoration method for restoring a disconnected radio channel which is one of a plurality of the radio channels; and a reconnecting unit operable to reconnect the disconnected radio channel which is one of a plurality of the radio channels, when accepting from the input unit an input of the user indicating that restoration is performed that is pursuant to the restoration method, on the basis of one of the two pieces of restoration information memorized by the memory unit that corresponds to the disconnected radio channel.

Accordingly, when a radio channel is disconnected, it is possible for the user to select from his/her own decision that the disconnected channel is restored, and such disconnected channel is restored as a result of the user selection.

Also, it is possible that the restoration method notifying unit notifies the user of an operation that the user needs to perform to select that the disconnected radio channel which is one of a plurality of the radio channels is restored, as the restoration method for the disconnected radio channel by displaying the operation.

Accordingly, it is possible for the user to easily restore the disconnected radio channel just by performing a displayed operation.

What is more, it is possible that the notifying unit has a displaying unit operable to notify the disconnected radio channel which is one of a plurality of the radio channels by displaying the disconnected radio channel, and that the restoration method notifying unit notifies the user of the operation that the user needs to perform by displaying the operation on the displaying unit.

Accordingly, since which channel of one of a plurality of the radio channels is disconnected and the restoration method for the disconnected radio channel are displayed on the same displaying unit, it is easy to specify a cause of the disconnection and to restore such disconnected radio channel.

Moreover, it is possible that the displaying unit is a touch panel display, and that the input unit accepts an input upon detection of a touch operation performed by the user on a screen of the touch panel display.

Accordingly, it is possible for the user to easily perform a restoration operation for the disconnected radio channel.

Furthermore, it is possible that the first communication device further includes an input unit operable to accept an input from the user, and that the communication system further comprises: a remedy notifying unit operable to notify the user of a plurality of remedies for a disconnection of one of a plurality of the radio channels; and a remedy performing unit operable to perform one of a plurality of the remedies selected by the user using the input unit.

Accordingly, it is possible for the user to select a remedy s/he wishes from among a plurality of the remedies for the disconnected radio channel, and then such selected remedy is carried out.

Also, it is possible that the relay device has a communication capability, the first communication device further includes: an input unit operable to accept an input from the user; and an identification information memory unit operable to memorize relay device identification information for identifying the relay device as restoration information required to restore the disconnected radio channel between the first communication device and the relay device, and that the communication system further comprises: a remedy notifying unit operable to notify the user of a plurality of remedies, when the radio channel between the first communication device and the relay device is disconnected, including a reconnection method for reconnecting the disconnected radio channel and a switching method for switching from a state in which the first communication device and the second communication device communicate with each other via the relay device to a state in which the relay device and the second communication device communicate with each other without using the first communication device; a reconnecting unit operable to reconnect the disconnected radio channel on the basis of the relay device identification information memorized by the identification information memory unit, when the reconnection method is selected by the user using the input unit; and a switching unit operable to switch to a communication carried out between the relay device and the second communication device without using the first communication device, when the switching method is selected by the user using the input unit.

Accordingly, when the radio channel between the first communication device and the relay device is disconnected, either the reconnection of the disconnected radio channel or the switch to the relay device which is independent of the first communication device in order to communicate with the second communication device, is carried out according to the user selection.

An advantage of carrying out a communication using the relay device is as follows: even when the radio channel between the first communication device and the relay device is unrestorable due to an undesirable communication state caused by wave interference, for example, the radio channel between the relay device and the second communication device remains in a communication state, which allows a call to be carried out between the relay device and the second communication device.

What is more, the present invention may be configured to be a communication device in a communication system that comprises: a first communication device; a relay device that is connected to the first communication device by radio at close range and a second communication device via a network and that relays a communication between the first communication device and the second communication device; and a disconnection detecting unit operable to detect a disconnection of a radio channel between the first communication device and the relay device and a disconnection of a radio channel between the relay device and the second communication device, wherein the first communication device includes a notifying unit operable to notify a user which disconnection of a plurality of the radio channels is detected by the disconnection detecting unit.

According to this communication device, it is possible to achieve the same effects as described above.

Moreover, the present invention may be configured to be a relay device in a communication system that comprises: a first communication device; a relay device that is connected to the first communication device by radio at close range and a second communication device via a network and that relays a communication between the first communication device and the second communication device; and a disconnection detecting unit operable to detect a disconnection of a radio channel between the first communication device and the relay device and a disconnection of a radio channel between the relay device and the second communication device, wherein the first communication device includes a notifying unit operable to notify a user which disconnection of a plurality of the radio channels is detected by the disconnection detecting unit.

According to this relay device, it is possible to achieve the same effects as described above.

Furthermore, the present invention may be a notification method used in a communication system that comprises a first communication device and a relay device that is connected to the first communication device by radio at close range and a second communication device via a network and that relays a communication between the first communication device and the second communication device, the notification method including: a disconnection detecting step for detecting a disconnection of a radio channel between the first communication device and the relay device and a disconnection of a radio channel between the relay device and the second communication device; and a notifying step for notifying a user which disconnection of a plurality of the radio channels is detected in the disconnection detecting step.

According to this notification method, it is possible to achieve the same effects as described above.

Also, the present invention may be a program for a first communication device performing a notification method in a communication system that comprises the first communication device and a relay device that is connected to the first communication device by radio at close range and a second communication device via a network and that relays a communication between the first communication device and the second communication device, the program for having a computer execute one of the following steps performed by the first device: a disconnection detecting step for detecting a disconnection of a radio channel between the first communication device and the relay device and a disconnection of a radio channel between the relay device and the second communication device; and a notifying step for notifying a user which disconnection of a plurality of the radio channels is detected in the disconnection detecting step.

According to this program, it is possible to achieve the same effects as described above.

Japanese patent application No.2002-287934 filed Sep. 30, 2002 is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

The following explains the preferred embodiment according to the present invention with reference to the figures.

Figure 1:
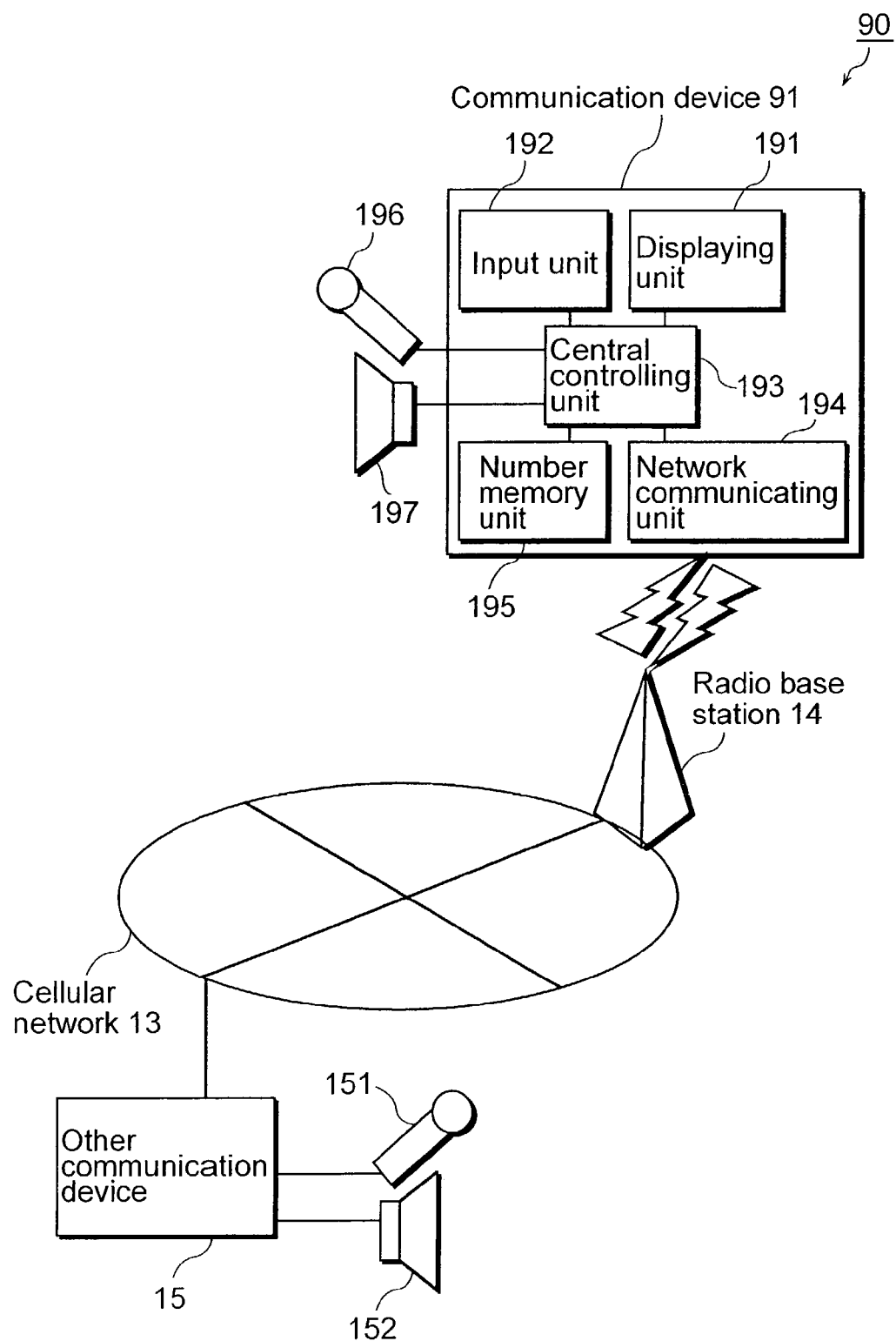
FIG. 1 is a block diagram showing the configuration of the conventional communication system.
Figure 2:
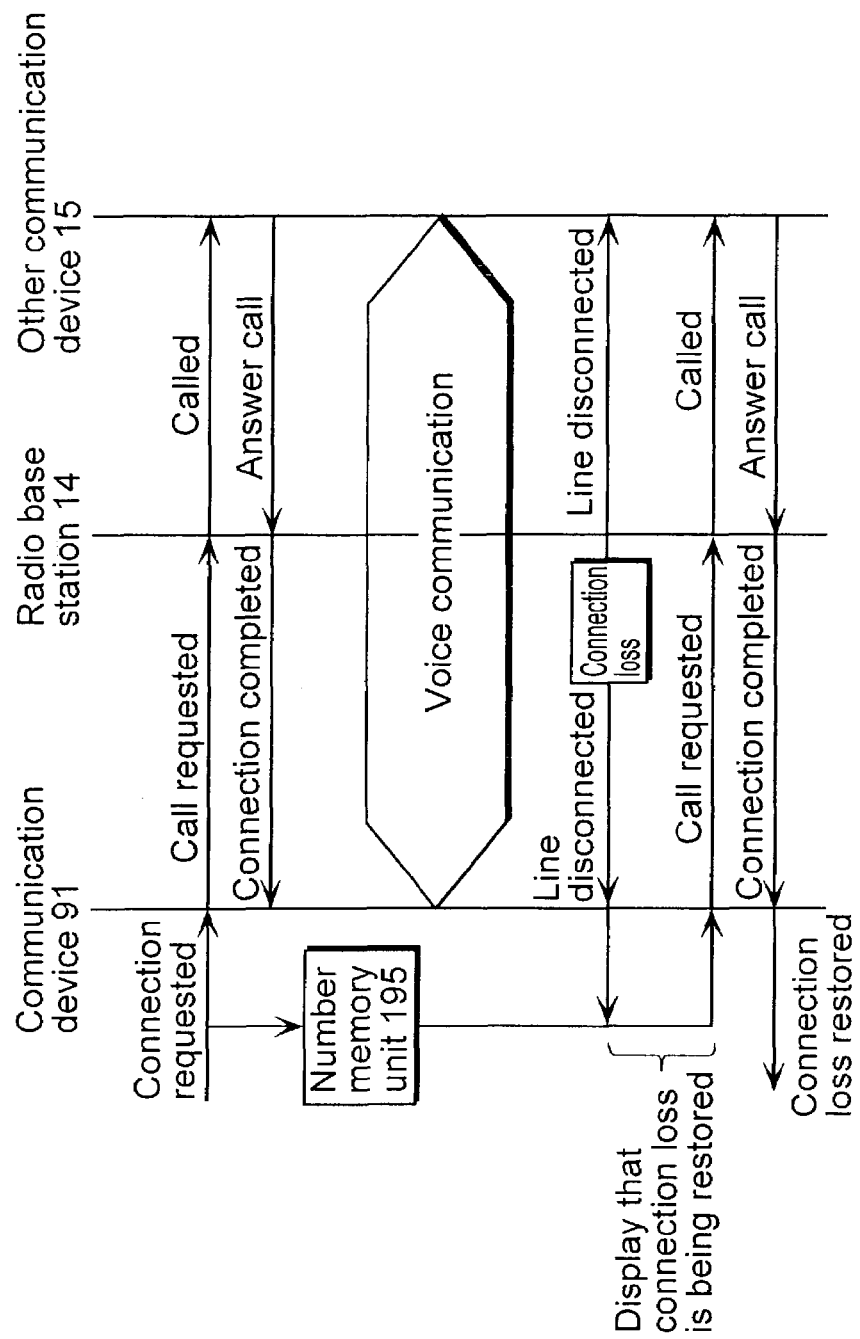
FIG. 2 is a communication sequence diagram showing sequences in the conventional communication system from when a call starts to when a communication line is disconnected and restored.
Figure 3:
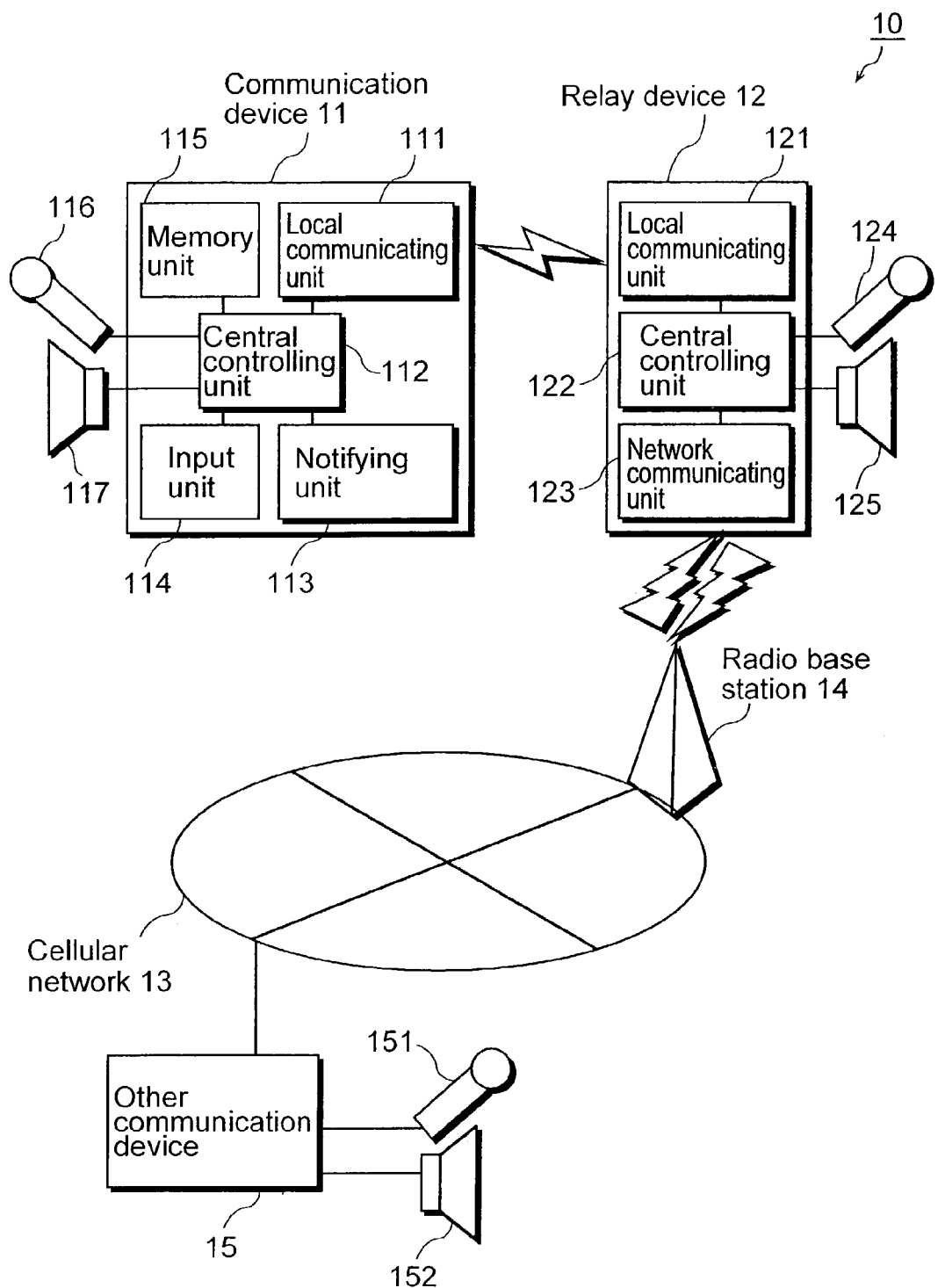
FIG. 3 is a block diagram showing a configuration of a communication system and a communication device according to a preferred embodiment of the present invention.

FIG. 3 is a configuration diagram illustrating a communication system 10 according to the present embodiment. In FIG. 3, such communication system 10 is comprised of a communication device 11, a relay device 12, the radio base station 14, the cellular network 13 and the other communication device 15. Note that the elements illustrated in FIG. 1 are assigned the same numbers also in FIG. 3.

The communication device 11 (the first communication device) includes a local communicating unit 111, a central controlling unit 112, a notifying unit 113, an input unit 114, a memory unit 115 and others, and a voice signal is inputted/outputted through a microphone 116 and a speaker 117. The relay device 12 includes a local communicating unit 121, a central controlling unit 122, a network communicating unit 123 and others, and a voice signal is inputted/outputted through a microphone 124 and a speaker 125.

Furthermore, the communication device 11 is connected to the other communication device 15 (the second communication device) via the relay device 12, the radio base station 14 and the cellular network 13. Note that the other communication device 15 may have the same configuration as that of the communication device 11, and a voice signal is inputted/outputted through a microphone 151 and a speaker 152.

Figure 4:
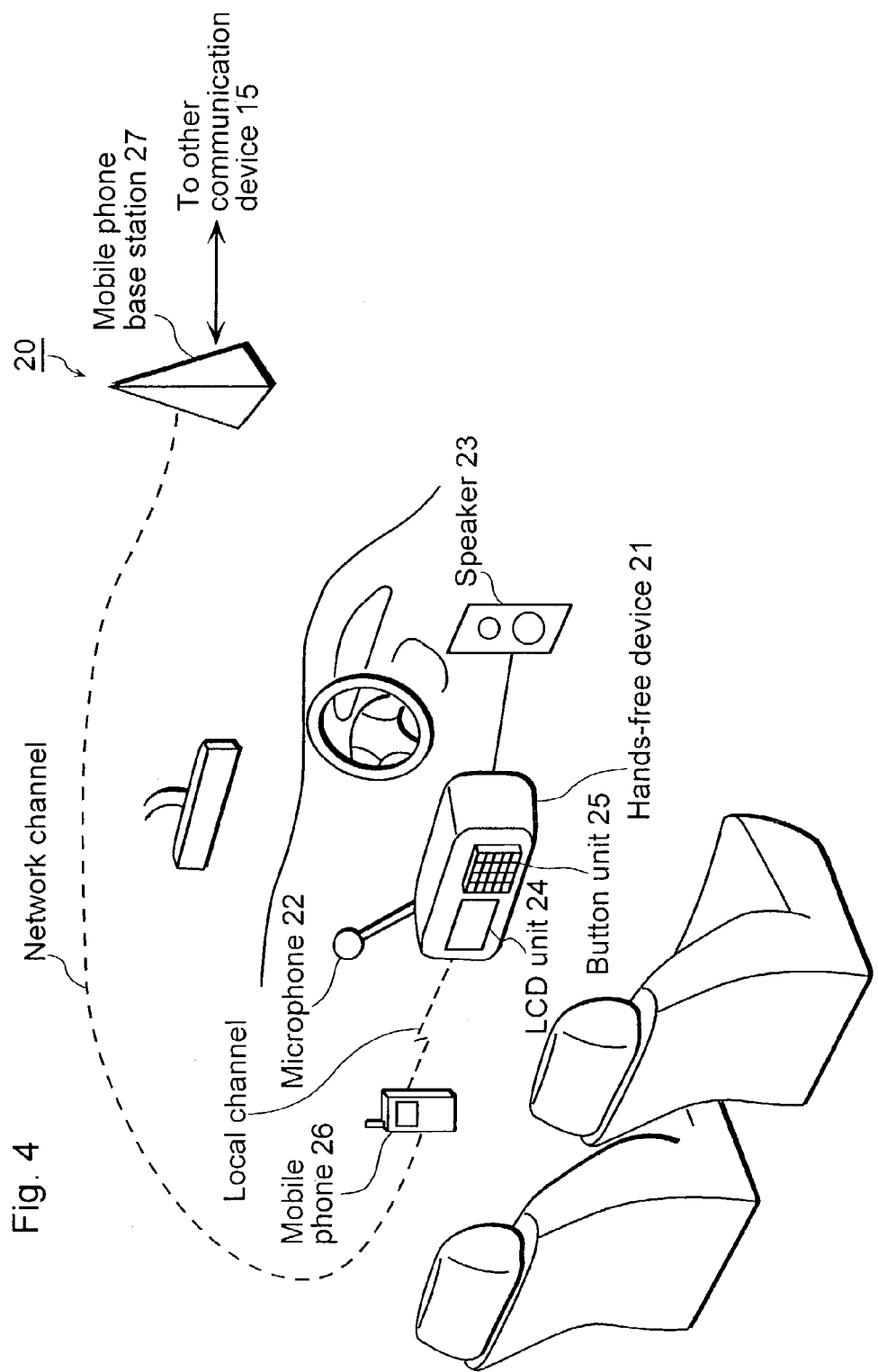
FIG. 4 is a configuration diagram illustrating a radio hands-free system which is an example of the communication system and the communication device according to the preferred embodiment of the present invention.

FIG. 4 is an example embodiment of the communication system illustrated in FIG. 3 showing the configuration of a radio hands-free system 20 in a car.

Such radio hands-free system 20 is comprised of a hands-free device 21 having an LCD (Liquid Crystal Display) unit 24 and a button unit 25, a microphone 22, a speaker 23, a mobile phone (mobile telephone equipment) 26, a mobile phone base station 27 and others.

Note that the hands-free device 21 and the mobile phone 26 in FIG. 4 correspond to the communication device 11 and the relay device 12 in FIG. 3 respectively, and the mobile phone base station 27 connected to the mobile phone 26 in FIG. 4 corresponds to the radio base station 14 in FIG. 3.

In the communication device 11 illustrated in FIG. 3, the input unit 114, which corresponds to the button unit 25 in FIG. 4, accepts user inputs including an outgoing call request.

The local communicating unit 111 accepts an outgoing call request from the input unit 114 via the central controlling unit 112 so as to communicate with the local communicating unit 121 of the relay device 12. Subsequently, a communication is performed between the communication device 11 and the relay device 12.

The notifying unit 113, which corresponds to the LCD unit 24 in FIG. 4, notifies a user of the communication device 11 of the state of a connection between the communication device 11, the relay device 12 and the other communication device 15, and others.

The memory unit 115 memorizes information required for restoring a disconnected channel of the above channels such as information for identifying the relay device 12 and information for identifying the other communication device 15.

The central controlling unit 112 performs specified control operations described below, upon the receipt of a signal from each unit of the communication device 11.

Furthermore, the microphone 116 in FIG. 3 corresponds to the microphone 22 in FIG. 4, and the speaker 117 in FIG. 3 to the speaker 23 in FIG. 4.

As describe above, in the relay device 12, the local communicating unit 121 communicates with the local communicating unit 111 of the communication device 11, while the network communicating unit 123 communicates with the radio base station 14. As a result, a communication is performed between the relay device 12 and the other communication device 15. The central controlling unit 122 performs specified control operations described below, upon the receipt of a signal from each unit which includes the local communicating unit 121, the network communicating unit 123 and the microphone 124.

The following explains operations in the communication system with the above configuration according to the present embodiment, with reference to the figures.

First, an explanation is given for the operation of each unit of the communication device 11, the relay device 12 and the other communication device 15 when a communication takes place normally.

Figure 5:
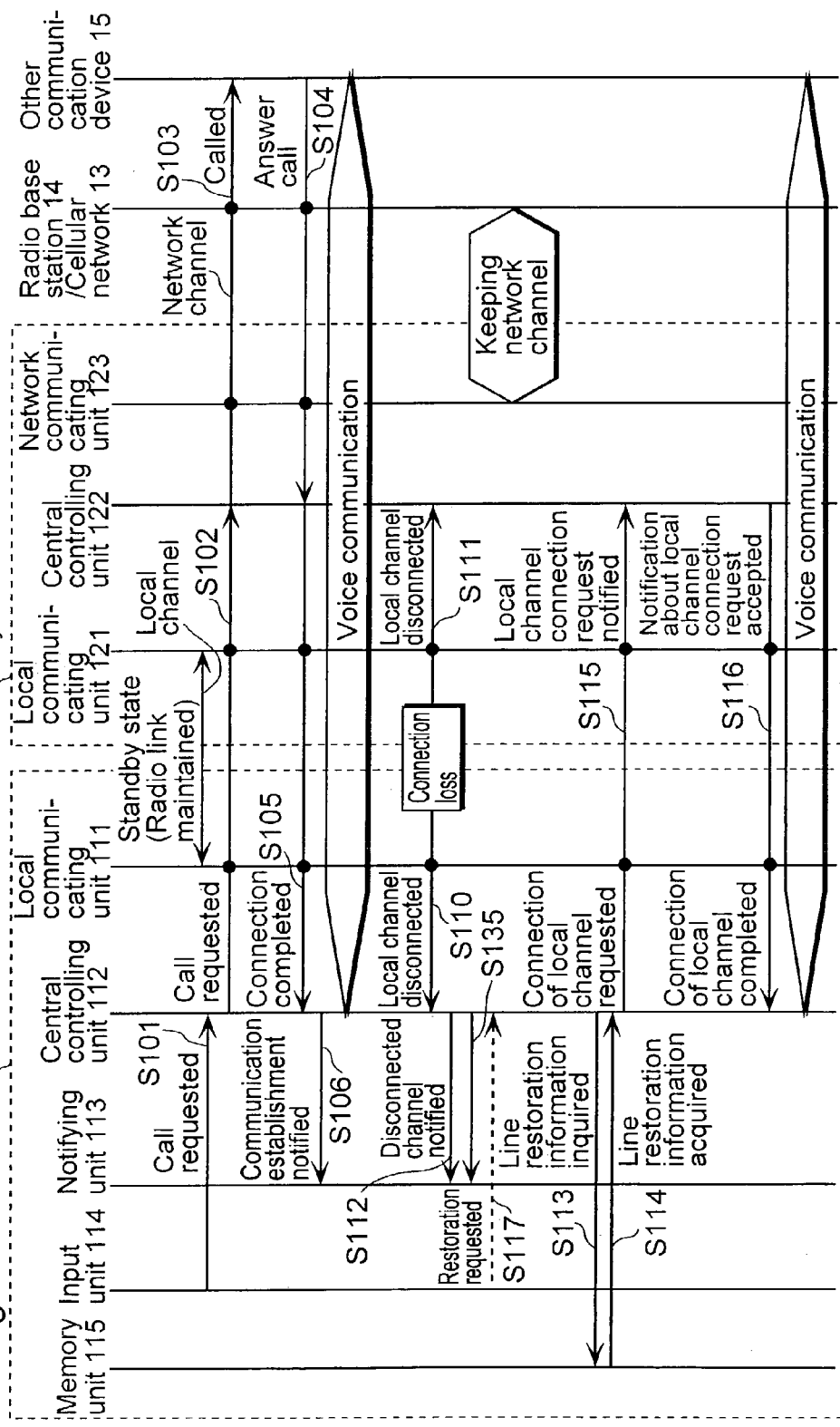
FIG. 5 is a communication sequence diagram showing an operation of each unit when a communication takes place normally in the communication system, and when a radio channel between the communication device and the relay device is disconnected according the preferred embodiment of the present invention.

FIG. 5 is a communication sequence diagram showing the operation of each unit when a communication takes place normally between the communication device 11, the relay device 12, and the other communication device 15, and when a radio channel between the communication device 11 and the relay device 12 is disconnected.

Providing that the communication device 11 and the relay device 12 are connected via a radio channel between the local communicating unit 111 and the local communicating unit 121 (to be referred to as "local channel" hereinafter), the central controlling unit 112 of the communication device 11 accepts from the input unit 114 a signal indicating an outgoing call request to the other communication device 15 (Step S101).

Following this, such signal indicating an outgoing call request is transmitted to the central controlling unit 122 of the relay device 12 via the local channel between the local communicating unit 111 and the local communicating unit 121 (Step S102). Upon the receipt of such signal, the central controlling unit 122 of the relay device 12 makes an outgoing call request to the other communication device 15.

To put it another way, the network communicating unit 123 of the relay device 12 establishes a radio channel between the radio base station 14 of the cellular network 13 (to be referred to as "network channel" hereinafter), transmits the outgoing call request signal to the radio base station 14 which is then delivered to the other communication device 15 via the cellular network 13 (Step S103). When detecting the call, the other communication device 15 transmits a signal indicating that the call is accepted to the radio base station 14 via the cellular network 13, and then such signal is transmitted to the central controlling unit 122 of the relay device 12 (Step S104). Furthermore, the central controlling unit 122 of the relay device 12 transmits a signal indicating that the connection between the communication device 11 and the other communication device 15 is completed, to the central controlling unit 112 of the communication device 11 (Step S105).

In this manner, it becomes possible for the communication device 11 and the other communication device 15 to have a call (Voice communication in FIG. 5). Note that if an outgoing call request is made from the other communication device 15 to the communication device 11 via the relay device 12, a network channel and a local channel are established just like the above case, allowing a call between the other communication device 15 and the communication device 11.

At this stage, the central controlling unit 112 outputs to the notifying unit 113 a control signal for making such notifying unit 113 notify the user of a state in which the local channel is established between the communication device 11 and the relay device 12, and a state in which the network channel is established between the relay device 12 and the radio base station 14 (Step S106).

Since the communication system which enters the conversation state after the above communication sequences is ready for transmitting/receiving a voice signal, a voice signal on the part of the communication device 11 inputted through the microphone 116 is transmitted to the relay device 12 via the local communicating unit 111. In the relay device 12, the local communicating unit 121 receives such voice signal, which is then transmitted to the radio base station 14 by the network communicating unit 123. The other communication device 15 receives the voice signal from the cellular network 13 so as to output voice through the speaker 152.

Meanwhile, when voice inputted through the microphone 151 of the other communication device 15 is transmitted to the cellular network 13, in the relay device 12, the network communicating unit 123 receives such voice signal from the radio base station 14, and the local communicating unit 121 transmits the voice signal to the communication device 11. The local communicating unit 111 of the communication device 11 receives such voice signal, which is then outputted as voice through the speaker 117.

The foregoing description explains the sequences when a communication is taking place normally without the occurrence of any communication failure.

Figure 7:
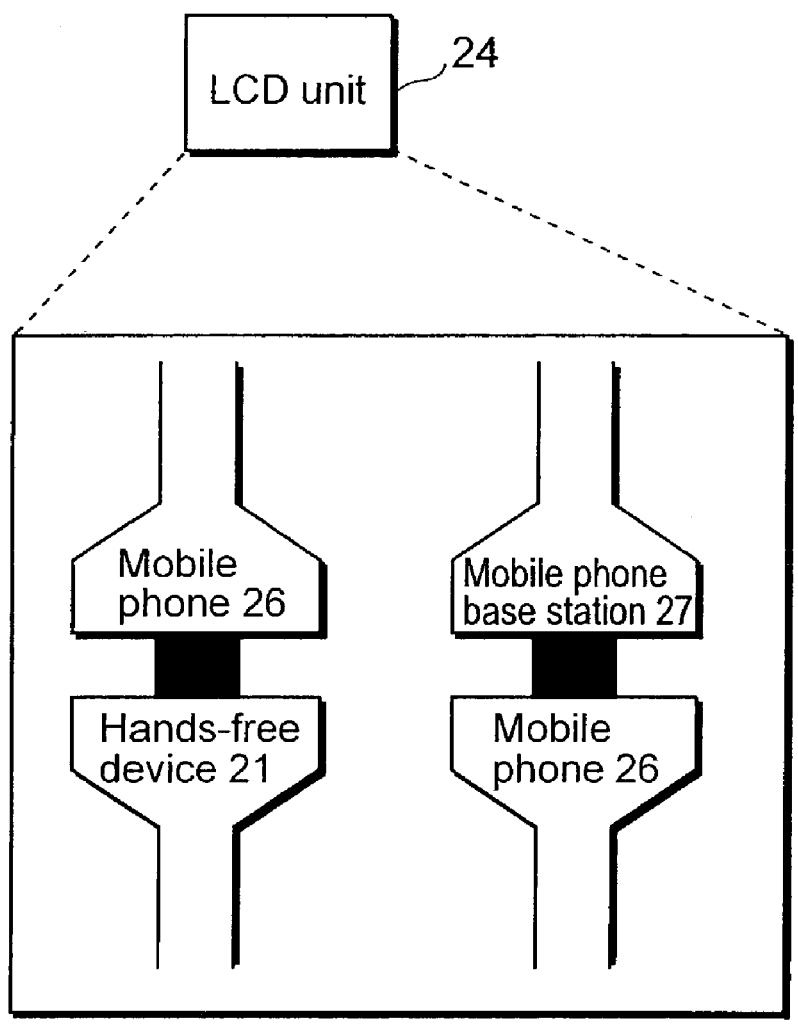
FIG. 7 is a diagram showing a state of a communication connection between the hands-free device and the mobile phone, and a state of a communication connection between the mobile phone and the mobile phone base station according to the preferred embodiment of the present invention.

Here, referring to FIGS. 3, 4 and 7, an explanation is given for the case where the above-described operations to be performed when a call is conducted normally is applied to the communication system 10 which includes the radio hands-free system 20 in a car.

In the radio hands-free system 20 which enters the conversation state after the outgoing and incoming call operations performed between the hands-free device 21 (corresponding to the communication device 11) and the other communication device 15, the hands-free device 21 is connected to the mobile phone 26 (corresponding to the relay device 12) via a local channel in compliance with such a radio communication standard as Bluetooth.

Meanwhile, the mobile phone 26 and the mobile phone base station 27 are connected to each other via a network channel in compliance with such a mobile phone standard as the PDC system so as to perform the transmission/receiving of a voice signal.

At this stage, a part or whole of the LCD unit 24 shows the user a state in which the local channel is established between the hands-free device 21 and the mobile phone 26, and a state in which the network channel is established between the mobile phone 26 and the mobile phone base station 27.

FIG. 7 is a diagram showing the state of the communication connection between the hands-free device 21 and the mobile phone 26, and the state of the communication connection between the mobile phone 26 and the mobile phone base station 27.

As FIG. 7 illustrates, the LCD unit 24 shows that the mobile phone 26 and the hands-free device 21 are connected for communication and that the mobile phone 26 and the mobile phone base station 27 are connected for communication.

A voice signal from the other communication device 15 transmitted via the network channel between the mobile phone base station 27 and the mobile phone 26 is transmitted from the mobile phone 26 to the hands-free device 21 via the local channel so as to be transformed to voice by the speaker 23.

Meanwhile, a voice signal inputted from the microphone 22 of the hands-free device 21 is transmitted to the mobile phone 26 via the local channel, which is then transmitted from the mobile phone 26 to the mobile phone base station 27 via the network channel and further to the other communication device 15.

Next, referring to a sequence diagram in FIG. 5, an explanation is given for the operation of each unit which takes place from when a channel disconnection occurs in the local channel between the communication device 11 and the relay device 12 to when such disconnected channel is restored automatically.

As illustrated in FIG. 5, if the local channel is suddenly disconnected while a voice signal is being transmitted/received, in the course of a call which starts in response to a call request from the communication device 11, the local communicating unit 111 of the communication device 11 and the local communicating unit 121 of the relay device 12 detect such disconnection and output signals indicating that respective communication channels are disconnected respectively to the central controlling unit 112 of the communication device 11 and the central controlling unit 122 of the relay device 12 (Steps S110 and S111).

At this stage, the central controlling unit 112 outputs to the notifying unit 113 a control signal for making such notifying unit 113 notify the user that the local channel between the communication device 11 and the relay device 12 is disconnected (Step S112). (This corresponds to the "Disconnected channel notified" in FIG. 5.) Upon the receipt of such control signal, the notifying unit 113 notifies the user of such disconnection of the local channel.

Next, the central controlling unit 112 of the communication device 11 makes an inquiry to the memory unit 115 about information required to restore the disconnected local channel (Step S113). Then, the central controlling unit 112 acquires from the memory unit 115 restoration information used to restore the local channel, which is relay device identification information for identifying the relay device 12 (Step S114). On the basis of such restoration information, the central controlling unit 112 outputs a signal indicating a request for connecting the local channel and notifies the central controlling unit 122 of the relay device 12 (Step S115).

The central controlling unit 122 of the relay device 12 outputs a signal indicating that the notification is accepted about the connection request for connecting the local channel, to the central controlling unit 112 of the communication device 11.

In this manner, the local channel is restored automatically. After the restoration, the communication device 11 resumes the communication with the other communication device 15.

Next, an explanation is given for the above-mentioned notification about the disconnected local channel to be made by the notifying unit 113. For example, in the radio hands-free system 20 shown in FIG. 4, the fact that the local channel is disconnected is notified to the user by displaying it in a part or whole of the LCD unit 24 as illustrated in FIG. 8A.

Figure 8A:
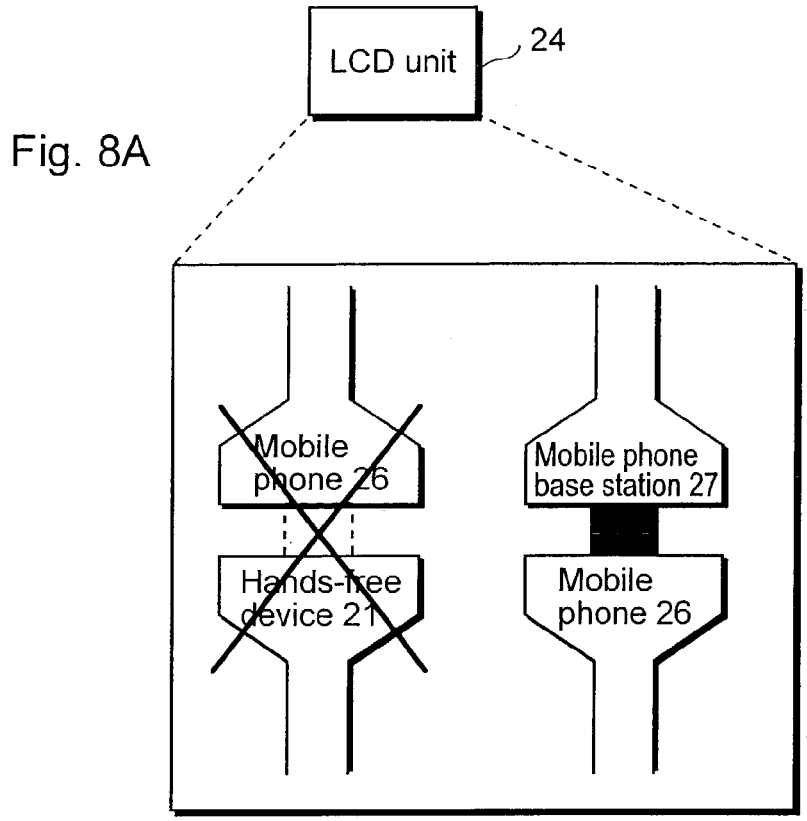
FIG. 8A is a diagram showing an example display of the LCD unit of the radio hands-free system according to the preferred embodiment of the present invention.

FIG. 8A is a diagram showing states of communication connections of the local channel and the network channel.

As illustrated in FIG. 8A, the LCD unit 24 shows that the communication between the mobile phone 26 and the hands-free device 21 is disconnected and that the communication between the mobile phone 26 and the mobile phone base station 27 is connected.

Since which radio channel is disconnected is displayed as described above and the hands-free device 21 (corresponding to the communication device 11 in FIG. 3) automatically restores the local channel by the use of the information stored in the memory unit 115 (See FIG. 3), the user does not have to perform an operation on the button unit 25 hastily, which consequently allows such user to concentrate on driving.

Note that in such a case, the information stored in the memory unit 115 of the hands-free device 21 is information for identifying (specifying) the mobile phone 26 used to restore the local channel. If the local communicating unit 121 (See FIG. 3) of the mobile phone 26 (corresponding to the relay device 12 in FIG. 3) is realized by a Bluetooth module, such information is described as "Bluetooth Device Address (BD_ADDR)."

Next, with reference to FIG. 5, an explanation is given for the case where a communication breaks down in the local channel between the communication device 11 and the relay device 12 and an inquiry is made whether the user wishes to restore the local channel or not.

If the local channel is disconnected, the local communicating unit 111 of the communication device 11 detects such disconnection and outputs a signal indicating a disconnection to the central controlling unit 112 (Step S110).

When this is done, the central controlling unit 112 outputs a control signal to the notifying unit 113 for making such notifying unit 113 notify the user of the fact that the local channel between the communication device 11 and the relay device 12 is disconnected as well as of a plurality of remedies for the disconnection (Step S135).

To be more specific, such plurality of remedies are the following methods: a method for restoring the local channel; and a switching method for making a switch from the communication device 11 to the relay device 12 so as to communicate with the other communication device 15 without using the communication device 11, if the relay device 12 is capable of serving as a substitute for the commutation device 11.

An example notification is as described below.

Figure 9A:
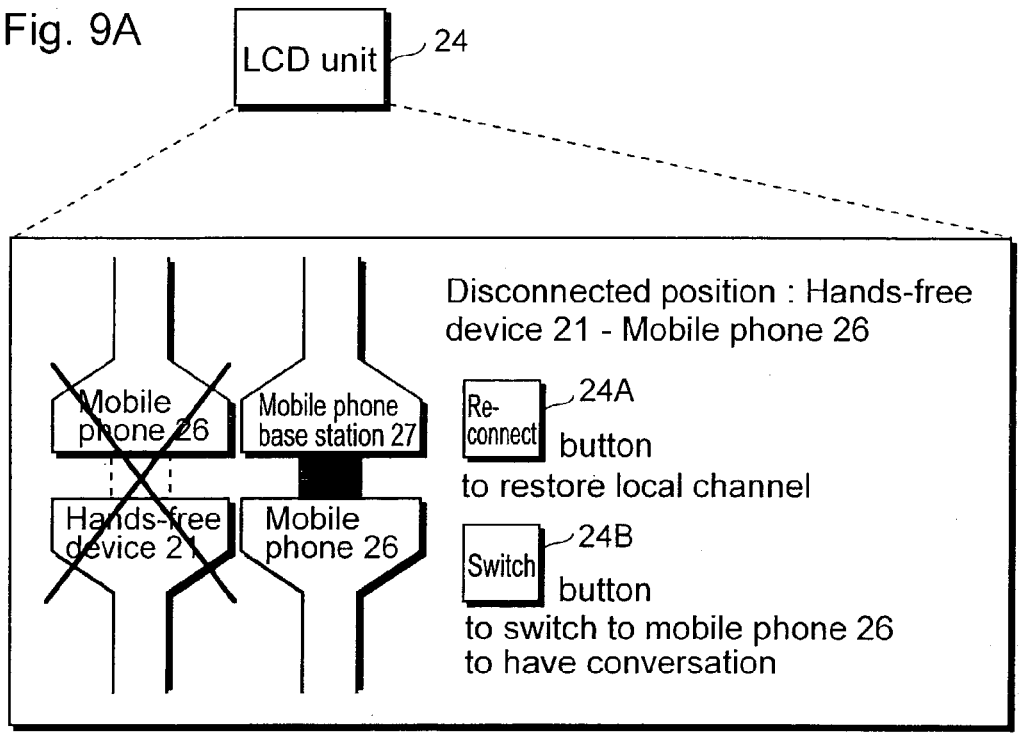
FIG. 9A is a diagram showing another example display of the LCD unit of the radio hands-free system according to the preferred embodiment of the present invention.

FIG. 9A is a diagram showing a display of the LCD unit 24 in the case where the communication system is the radio hands-free system 20 illustrated in FIG. 4.

In FIG. 9A, a part or whole of the LCD unit 24 (corresponding to the notifying unit 113) shows a state in which the local channel between the mobile phone 26 (corresponding to the relay device 12) and the hands-free device 21 (corresponding to the communication device 11) is disconnected. In addition, a part or whole of the LCD unit 24 also shows the restoration method for restoring the local channel (reconnection method) and the switching method for making a switch from the hands-free device 21 to the mobile phone 26 so as to communicate with the other communication device 15 as the remedies for the disconnection.

Such restoration method for restoring the local channel indicates that, by pressing "Reconnect" button on the button unit 25 of the hands-free device 21 illustrated in FIG. 4, a selection is made for restoring the local channel, while the switching method for switching to a communication using the mobile phone 26 indicates that, by pressing the "Switch" button on the button unit 25, a switch is made from the hands-free device 21 to the mobile phone 26 so that a communication not by the use of the hands-free device 21 is selected.

Then, if the user performs an input operation via the input unit 114 indicating that the local channel is to be restored, in response to the notification from the notifying unit 113 presenting the above remedies (Step S117, corresponding to "Restoration requested" in FIG. 5), the central controlling unit 112 acquires information required for restoring the disconnected local channel from the memory unit 115, and restores the local channel based on such acquired restoration information, as in the case of the above-mentioned automatic restoration.

In other words, the previous paragraph explains the case where an operation for selecting the button on the button unit 25 (See FIG. 4) indicating that the local channel is to be restored (e.g. reconnection button) is accepted from the user who saw the LCD unit 24 illustrated in FIG. 9A.

Figure 10:
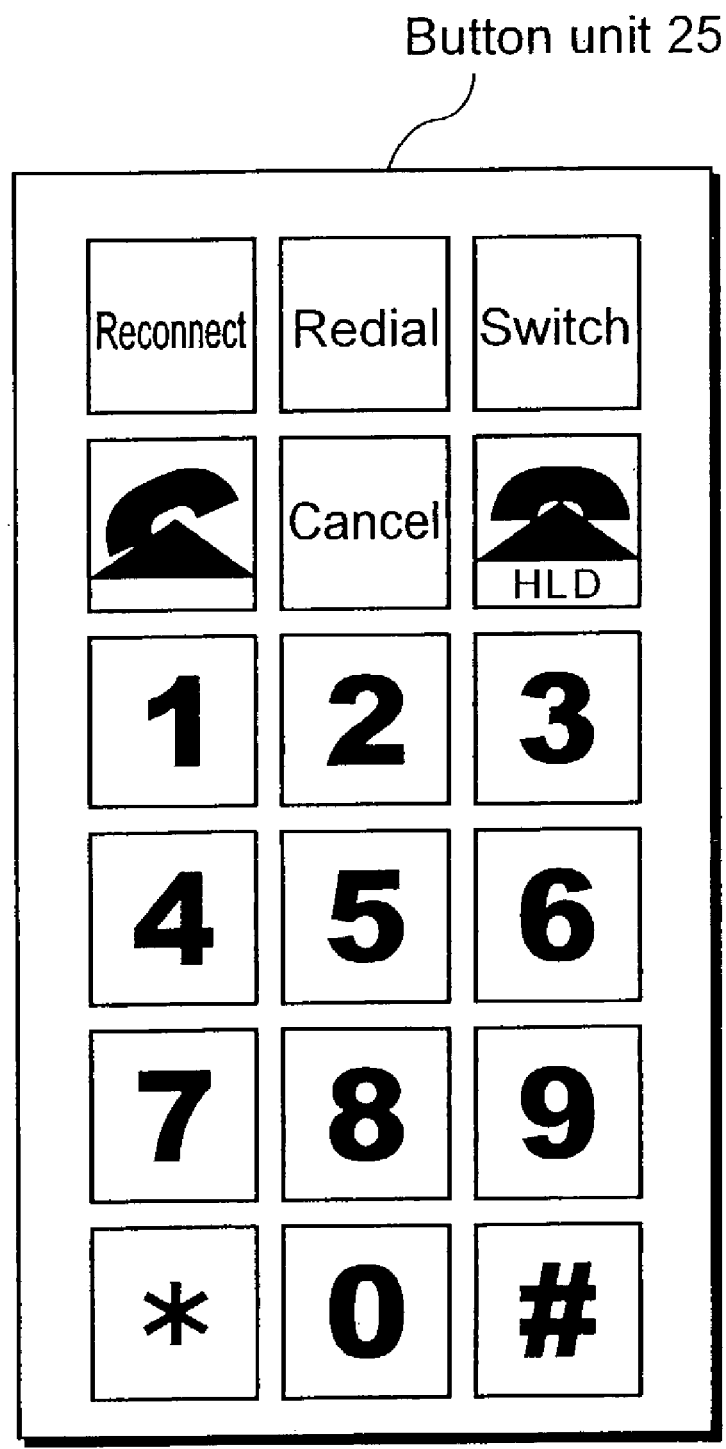
FIG. 10 is a diagram showing a structure of the button unit of the radio hands-free system according to the preferred embodiment of the present invention.

FIG. 10 is a diagram showing the structure of the button unit 25. The above-mentioned reconnection button is placed at the upper left corner of the button unit 25.

Meanwhile, when the user performs an input operation indicating that a switch is made from the communication device 11 to the relay device 12, the central controlling unit 112 terminates the operation of the communication device 11. Consequently, it becomes possible for the user to continue the communication with the other communication device 15 by using the relay device 12 which is located within a relatively close range.

To put it another way referring to FIG. 9A, when an input operation indicating that a switch is made from the hands-free device 21 to the mobile phone 26 is accepted (e.g. the switch button is selected) from the user via the button unit 25 (See FIG. 4), the hands-free device 21 terminates its operation.

As a result, it becomes possible for the user to continue the communication by using the mobile phone 26 which is located within a relatively close range.

As described above, it is possible for the user to instantly know that the communication is disabled due to the disconnection of the local channel from the contents displayed on the LCD unit 24. Furthermore, since the next operation method is shown when a disconnection occurs in the channel, it is also possible for the user to move on to the next operation for selecting either restoration or switching through an easy input operation without any hustle.

If the LCD unit 24 shows neither that the radio channel is disconnected nor the next operation method as explained above, the user thinks wrongly that a disconnection occurred in the network channel between the mobile phone 26 and the mobile phone base station 27, as a result of which such user hastily performs wrong operations which include redialing the last number and outgoing call processing on the button unit 25. However, with the radio hands-free system 20 according to the present embodiment, it possible to avoid such wrong operations.

The reason for providing a remedy of switching from the hands-free device 21 (corresponding to the communication device 11) to the relay device 12 (corresponding to the mobile phone 26) here is described below. Even if it is impossible to restore the local channel between the hands-free device 21 (corresponding to the communication device 11) and the mobile phone 26 (corresponding to the relay device 12) due to a condition undesirable for a channel (e.g. wave interference between another radio), the network channel between the mobile phone 26 (corresponding to the relay device 12) and the mobile phone base station 27 (corresponding to the radio base station 14) remains in the communication state as shown in FIG. 5, meaning that it is possible for the user to have a call with the other communication device 15 using the mobile phone 26. However, if the user continues an operation for restoring the local channel between the hands-free device 21 and the mobile phone 26 under such an undesirable channel condition, the conversation state continues between the mobile phone 26 and the other communication device 15 without the user knowing it.

When in the above situation, although a selection is made between restoring the local channel and switching from the hands-free device 21 to the mobile phone 26 through an input operation by pressing the reconnection button or the switch button on the button unit 25 illustrated in FIG. 4 (See FIG. 10 for details), it is also possible to make such a selection not through a button operation but though a touch operation by touching a touch panel. For example, the LCD unit 24 illustrated in FIG. 9A serves as a touch panel. On such touch panel, by the user touching a touch unit 24A indicated as "Reconnect" on the LCD, a selection is made for restoring the local channel, and by the user touching a touch unit 24B indicated as "Switch" on the LCD, a selection is made for making a switch from the hands-free device 21 to the mobile phone 26.

Next, an explanation is given for the operation of each unit when an abrupt disconnection occurs in the network channel between the relay device 12 and the radio base station 14 in the middle of a call.

Figure 6:
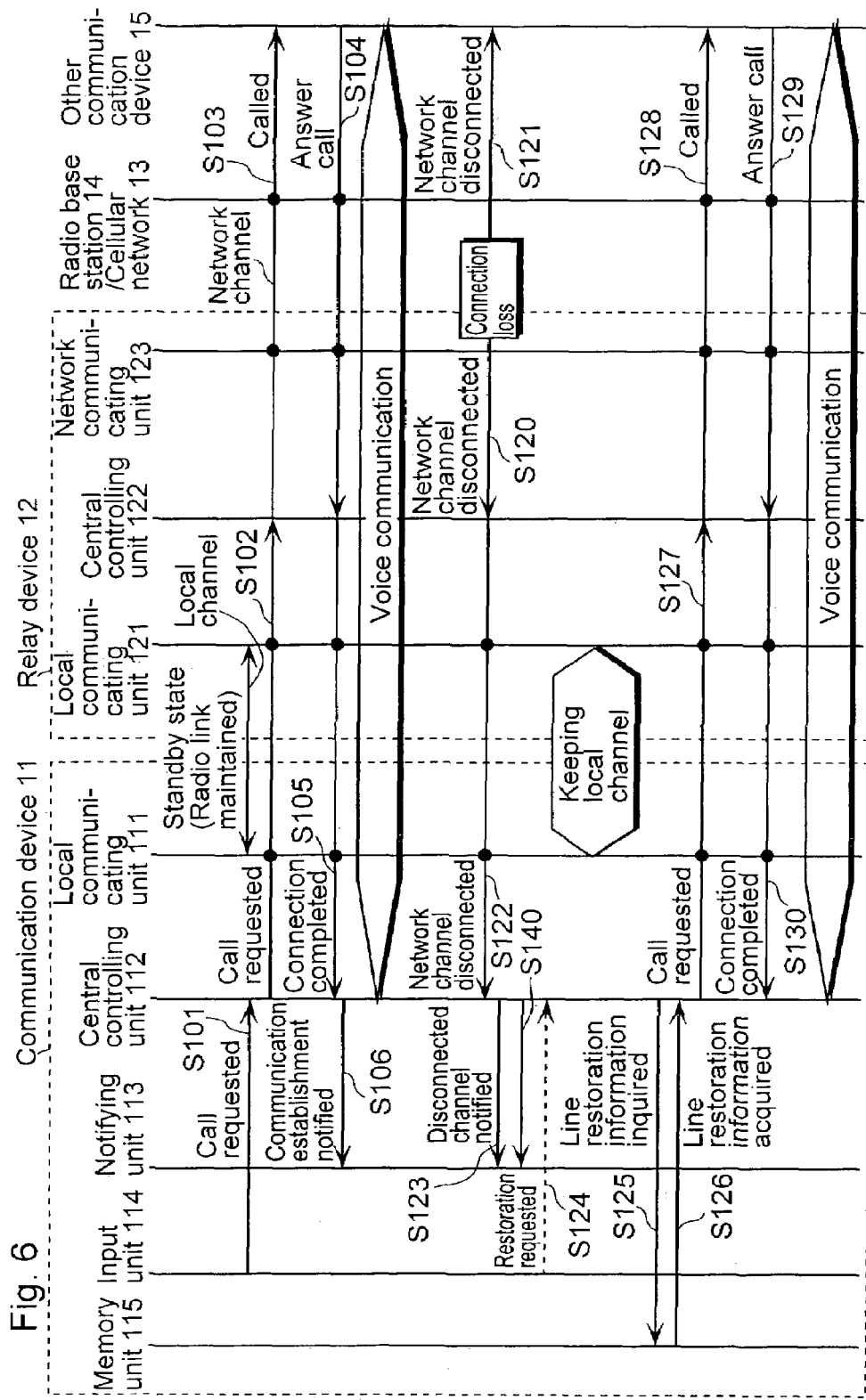
FIG. 6 is a communication sequence diagram showing an operation of each unit when a communication takes place normally in the communication system, and when the radio channel between the relay device and the radio base station is disconnected according to the preferred embodiment of the present invention.

FIG. 6 is a sequence diagram showing the operation of each unit when a communication takes place normally between the communication device 11, the relay device 12 and the other communication device 15, and when a disconnection occurs in the network channel between the relay device 12 and the radio base station 14.

Note that the elements illustrated in FIG. 5 are assigned the same numbers also in FIG. 6 and therefore that an explanation thereof is omitted.

Also not that in FIG. 6, sequences for normal communication connections between the communication device 1t, the relay device 12 and the radio base station 14 are the same as those explained in FIG. 5 and therefore that an explanation thereof is omitted.

A disconnection of the network channel is detected by the network communicating unit 123 of the relay device 12 and then notified to the central controlling unit 122 (Step S120). Furthermore, such disconnection of the network channel is also notified to the other communication device 15 (Step S121).

Next, the central controlling unit 122 transmits a signal for notifying the channel disconnection from the local communicating unit 121 to the communication device 11. In the communication device 11, the local communicating unit 111 receives such signal, which is then notified to the central controlling unit 112 (Step S122). At this stage, the central controlling unit 112 outputs to the notifying unit 113 a control signal for making such notifying unit 113 notify the user that the network channel between the relay device 12 and the radio base station 14 is disconnected (Step S123). Upon the receipt of such control signal, the notifying unit 113 notifies the user that a disconnection occurred in the network channel.

At the same time, the central controlling unit 112 makes an inquiry to the memory unit 115 about restoration information required to restore the disconnected network channel (Step S125), and acquires the restoration information (Step S126). Then, on the basis of such restoration information, the central controlling unit 112 restores the network channel.

When this is done, if the communication device 11 is the hands-free device 21 (See FIG. 4), the central controlling unit 112 acquires a subscriber's number, i.e. information for identifying the other communication device 15, from the memory unit 115, redials such number and performs automatic restoration of the network channel. This enables the user to concentrate on driving without hastily performing an operation on the button unit 25.

Processing for requesting a call, calling, accepting a call, completing a connection (Steps S127, S128, S129 and S130) to be performed through such redialing is analogous to the processing for requesting a call, calling, accepting a call, completing the connection (Steps S102, S103, S104 and S105) at the time of a normal communication mentioned above.

Here, an explanation is given for the notification made by the notifying unit 113.

Figure 8B:
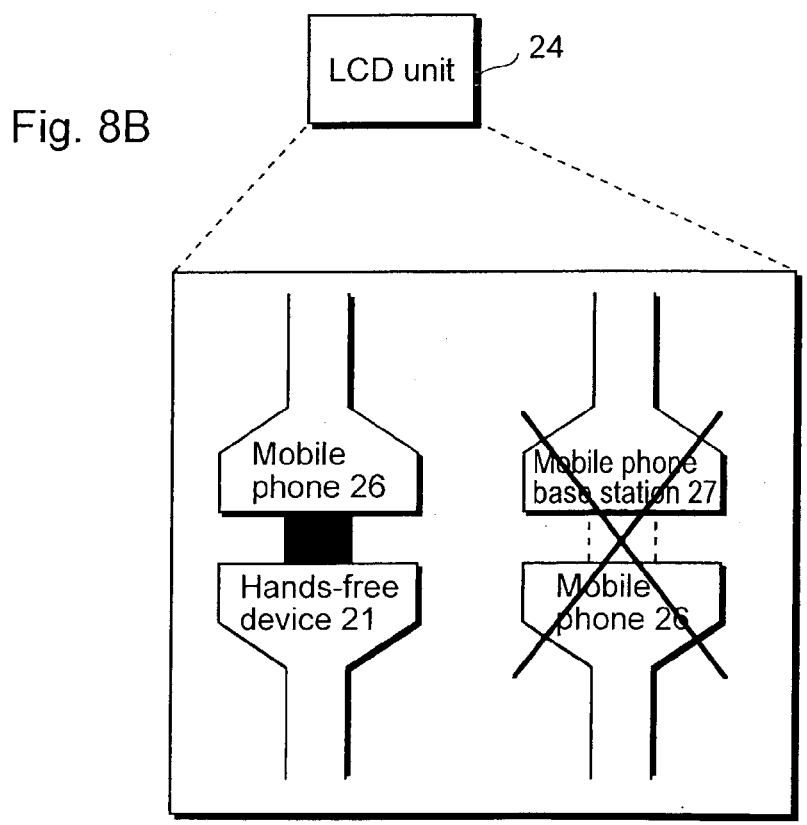
FIG. 8B is a diagram showing another example display of the LCD unit of the radio hands-free system according to the preferred embodiment of the present invention.

In the radio hands-free system 20 in FIG. 4, for example, the fact that the network channel is disconnected is notified to the user by showing it in part or whole of the LCD 24 as illustrated in FIG. 8B.

FIG. 8B is a diagram showing states of communications in the local channel and the network channel.

As shown in FIG. 8B, the LCD unit 24 shows that the mobile phone 26 and the hands-free device 21 is connected for communication and that the mobile phone 26 and the mobile phone base station 27 is disconnected for communication.

Next, an explanation is given for the case where the network channel between the relay device 12 and the radio base station 14 is suddenly disconnected and an inquiry is made whether the user wishes to restore the network channel or not. As illustrated in FIG. 6, such disconnection of the network channel is detected by the local communicating unit 123 of the relay device 12, and then notified to the central controlling unit 122 (Step S120). Next, the central controlling unit 122 transmits a signal for notifying the channel disconnection from the local communicating unit 121 to the communication device 11. In the communication device 11, the local communicating unit 111 receives such signal, which is then notified to the central controlling unit 112 (Step S122). These steps are analogous to those for automatic restoration.

At this stage, the central controlling unit 112 outputs to the notifying unit 113 a control signal for making such notifying unit 113 notify the user of the fact that the network channel between the relay device 12 and the radio base station 14 is disconnected as well as of a plurality of remedies for the disconnection (Step S140). To be more specific, such plurality of remedies are the restoration method for restoring the network channel (reconnection method) and a method for terminating the call between the communication device 11 and the other communication device 15 without restoring the network channel.

Upon the receipt of such control signal, the notifying unit 113 notifies the user of such disconnection of the network channel and the above two remedies. Then, the user is instructed to make a selection between such two remedies.

At this stage, if receiving an input indicating that the network channel is to be restored from the user via the input unit 114 (Step S124) (corresponding to "Restoration requested" from the input unit 114 to the central controlling unit 112 shown by the dotted arrow in FIG. 6), the central controlling unit 112 makes an inquiry to the memory unit 115 about restoration information required to restore the disconnected network channel (Step S125), and acquires the restoration information (Step S126). Then, on the basis of such restoration information, the central controlling unit 112 restores the network channel as described above. This restoration is analogous to the foregoing automatic restoration.

Meanwhile, when receiving an input indicating that the call is to be terminated from the user via the input unit 114, the central controlling unit 112 terminates the call without restoring the network channel.

An example notification made by the notifying unit 113 is described below.

Figure 9B:
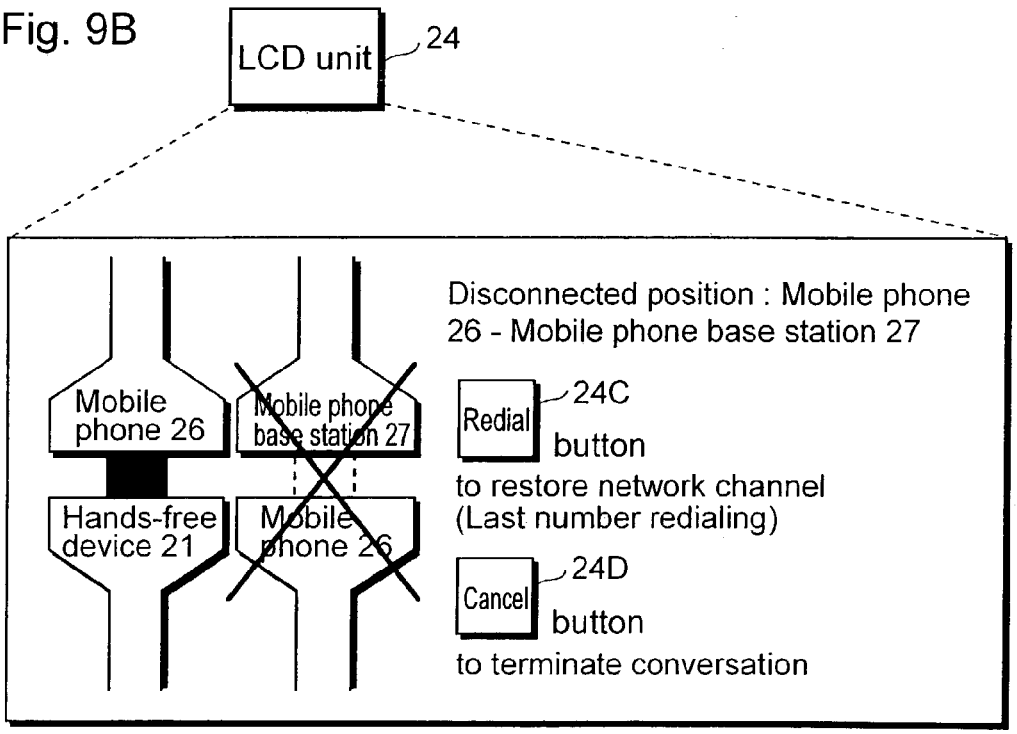
FIG. 9B is a diagram showing another example display of the LCD unit of the radio hands-free system according to the preferred embodiment of the present invention.

Taking the radio hands-free system 20 in FIG. 4 as an example, an example notification is as illustrated in FIG. 9B.

FIG. 9B is a diagram showing an example display shown on the LCD unit 24 when the network channel is disconnected.

As illustrated in FIG. 9B, a part or whole of the LCD unit 24 of the hands-free device 21 shows a state in which the mobile phone 26 and the hands-free device 21 are connected and a state in which the mobile phone 26 and the mobile phone base station 27 is disconnected for communication. In addition, the LCD unit 24 also shows the restoration method for restoring the network channel and the method for terminating the call between the hands-free device 21 and the other communication device 15 as the remedies for such disconnection.

This restoration method for restoring the network channel indicates that the restoration of the network channel is selected by pressing the redial button on the button unit 25 of the hands-free device 21 illustrated in FIG. 4. Moreover, the method for terminating the call indicates that the termination of the call between the hands-free device 21 and the other communication device 15 is selected by pressing the cancellation button on the button unit 15.

If the user selects and presses the button indicating the restoration of the network channel (e.g. the above-mentioned redial button) on the button unit 25, the central controlling unit 112 of the hands-free device 21 (corresponding to the communication device 11) reads out the restoration information (the subscriber's number of the other communication device 15 serving as communication device identification information) stored in the memory unit 115 and restores the disconnected network channel (redial the subscriber's number). On the other hand, if the user selects the button for terminating the call (e.g. the above-mentioned cancellation button), the central controlling unit 112 terminates the call without redialing the subscriber's number.

As described above, it is possible for the user to instantly know that the communication is disabled due to the disconnection of the network channel from the contents shown on the LCD unit 24. What is more, since an instruction for the next operation method is provided when the disabled channel is disconnected, it is possible for the user to move on to the next operation, without haste, which is either the restoration of the channel or the termination of the call through an easy input operation.

Note that although a selection is made between the restoration of the network channel and the termination of the call through an input operation by pressing the redial button or the cancellation button on the button unit 25 illustrated in FIG. 4 (See FIG. 10 for details), it is also possible to make such a selection not through a button operation but though a touch operation by touching a touch panel. For example, the LCD unit 24 illustrated in FIG. 9B serves as a touch panel. On such touch panel, by the user touching a touch unit 24C indicated as "Redial" on the LCD, a selection is made for restoring the network channel, and by the user touching a touch unit 24D indicated as "Cancel" on the LCD, a selection is made for terminating the call between the hands-free device 21 and the other communication device 15.

It should be understood that although FIGS. 5 and 6 depict the case where the communication device 11 makes an outgoing call request, the present embodiment is also applicable to the case where the other communication device 15 makes an outgoing call request and the communication device 11 receives such request (accepts a call).

Furthermore, when both the local channel and the network channel are disconnected, it is also possible for the notifying unit 113 to notify the user of the disconnection of both channels as well as of remedies and restoration methods for such disconnections.

Also note that although a mobile phone compliant with the PDC standard is taken as a concrete example of the relay device 12, the present embodiment is not restricted to mobile phones in the PDC system, meaning that it is also applicable to mobile phones pursuant to other mobile phone standards including IMT-2000, GSM, D-AMPS and IS-95. Furthermore, not only a mobile phone but also such an electronic device as a PDA (Personal Digital Assistant) having mobile phone functionality is also in the range of application.

Moreover, it is possible to apply the present embodiment to the case where the relay device 12 is a mobile phone supporting VoIP (Voice over IP) and the radio base station 14 (mobile phone base station 27) is a wireless LAN access point, and a communication between such mobile phone and wireless LAN access point is compliant with the wireless LAN (e.g. IEEE802.11b, IEEE802.11a) communication system.

Furthermore, although Bluetooth is employed for the local channel between the local communicating unit 111 of the communication device 11 and the local communicating unit 121 of the relay device 12, the present embodiment is not restricted to Bluetooth and therefore a communication employing other systems such as IEEE802.11a, IEEE802.11b and UWB (Ultra Wide Band) which allow a communication within a relatively close range as well as an infrared communication are also in the range of application, regardless of frequency band and its modem system.

Also, the present embodiment is applicable to a configuration in which two or more radio channels are multi-connected between the communication device 11 and the radio base station 14 via a plurality of relay devices 12 as well as a configuration in which a plurality of relay devices 12 are connected to the communication device 11, for only the difference such configurations make is that the amount of the contents shown on the notifying unit 113 and the amount of information to be stored in the memory unit 115 are increased.

Furthermore, although the LCD unit 24 integrated with the hands-free device 21 is presented as an embodiment of the notifying unit 113 of the communication device 11, a notification may be made in the form of an voice output as well as being outputted to such an external display as the display of a navigation device.

Note that although the button unit 25 integrated with the hands-free device 21 is presented as an embodiment of the input unit 114 of the communication device 11, an input operation may be performed by voice as well as through external buttons such as ones placed in an easy-to-operate position like the steering wheel of a car. Moreover, when a notification is made on the notifying unit 113 for instructing such user to perform an input operation, such a notification is made according to a method with which an input operation is performed on the input unit 114, without being limited to buttons.

Note that although the other communication device 15 is configured to have the same configuration as the communication device 11 in the present embodiment, it is not restricted to the configuration of the communication device 11, and therefore may be configured as a mobile phone and a fixed phone.

What is claimed is:

1. A communication system comprising:
   a first communication device;
   a relay device that is connected to said first communication device by radio at close range and connected to a second communication device via a network, said relay device being operable to relay a communication between said first communication device and the second communication device; and
   a disconnection detecting unit operable to detect a disconnection of a radio channel between said first communication device and said relay device, and detect a disconnection of a radio channel between said relay device and the second communication device,
   wherein said first communication device includes a notifying unit operable to notify a user which radio channel among a plurality of the radio channels is detected to be disconnected by said disconnection detecting unit.

2. The communication system according to claim 1, wherein:
   said first communication device is a hands-free device; and
   said relay device is a mobile telephone equipment.

3. The communication system according to claim 1, wherein said notifying unit has a displaying unit operable to notify the user which radio channel among the plurality of the radio channels is detected to be disconnected by said disconnection detecting unit by displaying the disconnected radio channel.

4. The communication system according to claim 1, wherein:
   said first communication device includes a memory unit operable to memorize at least one of first restoration information which is required to restore the radio channel between said first communication device and said relay device when the radio channel between said first communication device and said relay device is disconnected and second restoration information which is required to restore the radio channel between said relay device and the second communication device when the radio channel between said relay device and the second communication device is disconnected; and
   said communication system further comprises a restoring unit operable to reconnect a disconnected radio channel, when one of the radio channel between said first communication device and said relay device and the radio channel between first said relay device and the second communication device is disconnected, based on one of the first restoration information and the second restoration information memorized by said memory unit that corresponds to the disconnected radio channel.

5. The communication system according to claim 4, wherein:
   said memory unit is operable to memorize relay device identification information for identifying said relay device and communication device identification information for identifying the second communication device as the first restoration information and the second restoration information; and
   said restoring unit, when the radio channel between said first communication device and said relay device is disconnected, is operable to reconnect the radio channel between said first communication device and said relay device based on the relay device identification information, and when the radio channel between said relay device and the second communication device is disconnected, reconnect the radio channel between said relay device and the second communication device based on the communication device identification information.

6. The communication system according to claim 1, wherein:
   said first communication device further includes
      an input unit operable to accept an input from the user, and
      a memory unit operable to memorize at least one of first restoration information which is required to restore the radio channel between said first communication device and said relay device when the radio channel between said first communication device and said relay device is disconnected, and second restoration information which is required to restore the radio channel between said relay device and the second communication device when radio channel between said relay device and the second communication device is disconnected; and
   said communication system further comprises
      a restoration method notifying unit operable to notify the user of a restoration method for restoring a disconnected radio channel which is one of a plurality of the radio channels; and
      a reconnecting unit operable to reconnect the disconnected radio channel which is one of a plurality of the radio channels, when accepting from said input unit an input of the user indicating that restoration is performed pursuant to the restoration method, based on one of the first restoration information and the second restoration information memorized by said memory unit that corresponds to the disconnected radio channel.

7. The communication system according to claim 6, wherein said restoration method notifying unit is operable to notify the user of an operation that the user needs to perform to select to restore the disconnected radio channel which is one of a plurality of the radio channels, as the restoration method for restoring the disconnected radio channel, by displaying the operation.

8. The communication system according to claim 7, wherein:

said notifying unit has a displaying unit operable to notify the disconnected radio channel which is one of a plurality of the radio channels by displaying the disconnected radio channel; and said restoration method notifying unit is operable to notify the user of the operation that the user needs to perform by displaying the operation on said displaying unit.

9. The communication system according to claim 8, wherein:
said displaying unit is a touch panel display; and
said input unit is operable to accept an input upon detection of a touch operation performed by the user on a screen of said touch panel display.

10. The communication system according to claim 1, wherein:
said first communication device further includes an input unit operable to accept an input from the user; and
said communication system further comprises
a remedy notifying unit operable to notify the user of a plurality of remedies for a disconnection of one of a plurality of the radio channels, and
a remedy performing unit operable to perform one of the plurality of remedies which is selected by an operation of said input unit by the user.

11. The communication system according to claim 10, wherein said remedy notifying unit is operable to notify a reconnection method for reconnecting a disconnected radio channel which is one of a plurality of the radio channels as one of the plurality of the remedies.

12. The communication system according to claim 11, wherein said remedy notifying unit is operable to notify the user of an operation that the user needs to perform to select each of a plurality of the remedies by displaying the operation.

13. The communication system according to claim 12, wherein:
said notifying unit has a displaying unit operable to notify the disconnected radio channel which is one of a plurality of the radio channels by displaying the disconnected radio channel; and
said remedy notifying unit is operable to notify the user of the operation that the user needs to perform by displaying the operation on said displaying unit.

14. The communication system according to claim 13, wherein:
said displaying unit is a touch panel display; and
said input unit is operable to accept an input upon detection of a touch operation performed by the user on a screen of said touch panel display.

15. The communication system according to claim 1, wherein:
said relay device has a communication capability;
said first communication device further includes
an input unit operable to accept an input from the user, and
an identification information memory unit operable to memorize relay device identification information for identifying said relay device as restoration information which is required to restore the radio channel between said first communication device and said relay device when the radio channel between said first communication device and said relay device is disconnected; and
said communication system further comprises
a remedy notifying unit operable to notify the user of a plurality of remedies, when the radio channel between said first communication device and said relay device is disconnected, including a reconnection method for reconnecting the disconnected radio channel between said first communication device and said relay device and a switching method for switching from a state in which said first communication device and said second communication device communicate with each other via said relay device to a state in which said relay device and the second communication device communicate with each other without using said first communication devices,
a reconnecting unit operable to reconnect the disconnected radio channel based on the relay device identification information memorized by said identification information memory unit, when the reconnection method is selected by an operation of said input unit by the user, and
a switching unit operable to switch to a communication carried out between said relay device and the second communication device without using the first communication device, when the switching method is selected by an operation of said input unit by the user.

16. The communication system according to claim 15, wherein said remedy notifying unit is operable to notify the user of an operation that the user needs to perform to select one of the reconnection method and the switching method by displaying the operation, when the radio channel between said first communication device and said relay device is disconnected.

17. The communication system according to claim 16, wherein:
said notifying unit has a displaying unit operable to notify the disconnected radio channel by displaying the disconnected radio channel; and
said remedy notifying unit is operable to notify the user of the operation that the user needs to perform by displaying the operation on said displaying unit.

18. The communication system according to claim 17, wherein:
said first communication device is a hands-free device; and
said relay device is a mobile telephone equipment.

19. A communication device in a communication system that comprises:
a first communication device;
a relay device that is connected to said first communication device by radio at close range and connected to a second communication device via a network, said relay device being operable to relay a communication between said first communication device and the second communication device; and
a disconnection detecting unit operable to detect a disconnection of a radio channel between said first communication device and said relay device, and detect a disconnection of a radio channel between said relay device and the second communication device,
wherein said first communication device includes a notifying unit operable to notify a user which radio channel among a plurality of the radio channels is detected to be disconnected by said disconnection detecting unit.

20. The communication device according to claim 19, wherein:
said first communication device is a hands-free device; and
said relay device is a mobile telephone equipment.

21. The communication device according to claim 19, wherein said notifying unit has a displaying unit operable to notify the user which radio channel among the plurality of radio channels is detected to be disconnected by said disconnection detecting unit by displaying the disconnected radio channel.

22. The communication device according to claim 19, wherein:
said first communication device includes a memory unit operable to memorize at least one of first restoration information which is required to restore the radio channel between said first communication device and said relay device when the radio channel between said first communication device is disconnected, and second restoration information which is required to restore the radio channel between said relay device and the second communication device when the radio channel between said relay device and the second communication device is disconnected; and
said communication system further comprises a restoring unit operable to reconnect a disconnected radio channel, when one of the radio channel between said first communication device and said relay device and the radio channel between said relay device and the second communication device is disconnected, based on one of the first restoration information and the second restoration information memorized by said memory unit that corresponds to the disconnected radio channel.

23. The communication device according to claim 19, wherein:
said first communication device further includes
an input unit operable to accept an input from the user, and
a memory unit operable to memorize at least one of first restoration information which is required to restore the radio channel between said first communication device and said relay device when the radio channel between said first communication device and said relay device is disconnected, and second restoration information which is required to restore the radio channel between said relay device and the second communication device when the radio channel between said relay device and the second communication device is disconnected; and
said communication system further comprises:
a restoration method notifying unit operable to notify the user of a restoration method for restoring a disconnected radio channel which is one of a plurality of the radio channels; and
a reconnecting unit operable to reconnect the disconnected radio channel which is one of a plurality of the radio channels, when accepting from said input unit a specified input of the user pursuant to the restoration method, based on one of the first restoration information and the second restoration information memorized by said memory unit that corresponds to the disconnected radio channel.

24. A relay device in a communication system that comprises:
a first communication device;
a relay device that is connected to said first communication device by radio at close range and connected to a second communication device via a network, said relay device beinn operable to relay a communication between said first communication device and said second communication device; and
a disconnection detecting unit operable to detect a disconnection of a radio channel between said first communication device and the relay device, and detect a disconnection of a radio channel between said relay device and the second communication device,
wherein said first communication device includes a notifying unit operable to notify a user which radio channel among a plurality of the radio channels is detected to be disconnected by said disconnection detecting unit.

25. The relay device according to claim 24, wherein:
said first communication device is a hands-free device; and
said relay device is a mobile telephone equipment.

26. A notification method used in a communication system that comprises a first communication device and a relay device that is connected to the first communication device by radio at close range and connected to a second communication device via a network, and that relays a communication between the first communication device and the second communication device, said notification method including:
detecting a disconnection of a radio channel between the first communication device and the relay device, and detecting a disconnection of a radio channel between the relay device and the second communication device; and
notifying a user which radio channel among a plurality of the radio channels is detected to be disconnected in said detecting.

27. The notification method according to claim 26, wherein:
the first communication device is a hands-free device; and
the relay device is a mobile telephone equipment.

28. The notification method according to claim 26, wherein, in said notifying notifies the user of which radio channel among the plurality of radio channels is detected to be disconnected by displaying the disconnected radio channel.

29. The notification method according to claim 26, wherein:
the first communication device includes a memory unit operable to memorize at least one of first restoration information which is required to restore the radio channel between the first communication device and the relay device when the radio channel between the first communication device and the relay device is disconnected, and second restoration information which is required to restore the radio channel between the relay device and the second communication device when the radio channel between the relay device and the second communication device is disconnected; and
said notification method further includes restoring step for reconnecting a disconnected radio channel, when one of the radio channel between the first communication device and the relay device and the radio channel between the relay device and the second communication device is disconnected, based on one of the first restoration information and the second restoration information memorized by the memory unit that corresponds to the disconnected radio channel.

30. The notification method according to claim 26, wherein:
the first communication device includes
an input unit operable to accept an input from the user, and
a memory unit operable to memorize at least one of first restoration information which is required to restore the radio channel between the first communication device and the relay device when the radio channel between the first communication device and the relay device is disconnected, and second restoration information which is required to restore the radio channel between the relay device and the second communication device when the radio channel between the relay device and the second communication device is disconnected; and said notification method further includes
notifying the user of a restoration method for restoring a disconnected radio channel which is one of a plurality of the radio channels, and a reconnecting step for reconnecting the disconnected radio channel which is one of a plurality of the radio channels, when accepting from the input unit a specified input of the user pursuant to the restoration method, based on one of the first restoration information and the second restoration information memorized by the memory unit that corresponds to the disconnected radio channel.

31. A program for a first communication device performing a notification method in a communication system that comprises the first communication device and a relay device that is connected to the first communication device by radio at close range and a second communication device via a network and that relays a communication between the first communication device and the second communication device, said program being recorded on a computer-readable medium and causing a computer to execute operations performed by the first communication device, said operations comprising:

detecting a disconnection of a radio channel between the first communication device and the relay device and detecting a disconnection of a radio channel between the relay device and the second communication device; and notifying a user which radio channel among a plurality of the radio channels is detected to be disconnected in said disconnecting.

* * * * *

UNITED STATES PATENT AND TRADEMARK OFFICE
CERTIFICATE OF CORRECTION

| | |
|---|---|
| PATENT NO. | : 7,113,742 B2 |
| APPLICATION NO. | : 10/405694 |
| DATED | : September 26, 2006 |
| INVENTOR(S) | : Tsuyoshi Kindo et al. |

It is certified that error appears in the above-identified patent and that said Letters Patent is hereby corrected as shown below:

ON THE FRONT PAGE
In Item (57) Abstract:
"A communication system 10 is comprised of a communication device 11 and a relay device 12 that is connected to the communication device 11 by radio at close range and an other communication device 15 via a network and that relays a communication between the first device 11 and the other communication device 15. Such communication system 10 comprises local communicating units 112 and 121 and a network communicating unit 123 that detect a disconnection of a radio channel between the communication device 11 and the relay device 12 and a disconnection of a radio channel between the relay device 12 and the other communication device 15. The communication device 11 includes a notifying unit 113 that notifies a user of that a disconnection of which radio channel of a plurality of the radio channels is detected." should read --A communication system includes a first communication device and a relay device which is connected to the first communication device by radio at close range and connected to a second communication device via a network and which relays a communication between the first and second communication devices. The communication system includes local communicating units and a network communicating unit that detect a disconnection of a radio channel between the first communication device and the relay device and a disconnection of a radio channel between the relay device and the second communication device. The first communication device includes a notifying unit that notifies a user of which radio channel among a plurality of the radio channels is detected to be disconnected.--.

IN THE SPECIFICATION
Please replace column 1, line 1 through column 17, line 23 with the enclosed substitute specification, originally filed January 31, 2006, of which both a marked-up and clean copy are submitted herewith.

IN THE CLAIMS
Claim 4:
In column 18, line 3, "between first said" should read --between said--.

Claim 15:
In column 20, line 10, "communication devices," should read --communication device,--.

Claim 24:
In column 21, line 62, "device beinn operable" should read --device being operable--.

UNITED STATES PATENT AND TRADEMARK OFFICE
CERTIFICATE OF CORRECTION

PATENT NO. : 7,113,742 B2
APPLICATION NO. : 10/405694
DATED : September 26, 2006
INVENTOR(S) : Tsuyoshi Kindo et al.

It is certified that error appears in the above-identified patent and that said Letters Patent is hereby corrected as shown below:

IN THE CLAIMS (cont'd)
Claim 29:
In column 22, line 49, "includes restoring step for reconnecting" should read --includes reconnecting--.

Claim 30:
In column 23, line 11, "a reconnecting step for reconnecting the" should read --reconnecting the--.

Signed and Sealed this

Twenty-eighth Day of August, 2007

JON W. DUDAS
*Director of the United States Patent and Trademark Office*